US012333924B2

(12) United States Patent
Gilbert et al.

(10) Patent No.: US 12,333,924 B2
(45) Date of Patent: Jun. 17, 2025

(54) INTERACTIVE KIOSK WITH EMERGENCY CALL MODULE (71) Applicant: Ike Smart City, LLC, Columbus, OH (US)

(72) Inventors: Alan J. Gilbert, Westerville, OH (US); Lawrence A. Duarte, Arvada, CO (US); Cody C. Walker, Westminster, CO (US)

(73) Assignee: IKE SMART CITY, LLC, Columbus, OH (US)

(*) Notice: Subject to any disclaimer, the term of this patent is extended or adjusted under 35 U.S.C. 154(b) by 0 days.

(21) Appl. No.: 17/919,258

(22) PCT Filed: Apr. 16, 2021

(86) PCT No.: PCT/US2021/027818
§ 371 (c)(1),
(2) Date: Oct. 15, 2022

(87) PCT Pub. No.: WO2021/212067
PCT Pub. Date: Oct. 21, 2021

(65) Prior Publication Data
US 2023/0162591 A1 May 25, 2023

Related U.S. Application Data (60) Provisional application No. 63/010,998, filed on Apr. 16, 2020.

(51) Int. Cl.
G08B 25/12 (2006.01)
G08B 25/01 (2006.01)
G09F 27/00 (2006.01)

(52) U.S. Cl.
CPC ........... G08B 25/12 (2013.01); G08B 25/014 (2013.01); G09F 27/00 (2013.01)

(58) Field of Classification Search
CPC .... G08B 25/12; G08B 25/014; G08B 25/016; G09F 27/00; H04M 11/04
See application file for complete search history.

(56) References Cited

U.S. PATENT DOCUMENTS 5,243,322 A * 9/1993 Thompson .......... B60R 25/1004
340/428
5,485,553 A * 1/1996 Kovalick ........... H04N 1/00283
358/1.6

(Continued)

OTHER PUBLICATIONS

International Search Report and Written Opinion dated Jul. 14, 2021 from PCT Application No. PCT/US21/27818.

Primary Examiner — Curtis J King
(74) Attorney, Agent, or Firm — Wentsler LLC (57) ABSTRACT Provided are a publicly-accessible kiosk and method for requesting emergency assistance by a responder. The kiosk includes a base constructed for installation in a public setting, and an interface that is supportable by the base to receive user input corresponding to content requested to be presented by the kiosk. A control system, as a result of executing computer-accessible instructions, accesses information stored by a non-transitory computer memory and generates an output based on the user input received. A display device operatively connected to the control system to graphically display the content requested at the public setting based on the output of the control system. An emergency call module of the kiosk is activated in response to selection of an emergency activator to communicate with a remote terminal over a communication network and request assistance from a responder at the public setting.

20 Claims, 4 Drawing Sheets (56) References Cited

U.S. PATENT DOCUMENTS

| | | | | |
|---|---|---|---|---|
| 5,570,770 | A * | 11/1996 | Baaten | A61B 6/102 477/186 |
| 5,689,667 | A * | 11/1997 | Kurtenbach | G06F 3/0482 715/810 |
| 5,952,919 | A * | 9/1999 | Merrill | G08B 7/062 340/539.18 |
| 6,259,657 | B1 * | 7/2001 | Swinney | H04M 11/10 379/75 |
| 6,462,437 | B1 * | 10/2002 | Marmaropoulos | H02J 9/005 348/730 |
| 6,889,137 | B1 * | 5/2005 | Rychlak | G08G 1/096838 340/286.07 |
| 7,483,531 | B1 * | 1/2009 | Gordon | H04M 1/68 379/433.06 |
| 8,780,201 | B1 * | 7/2014 | Scalisi | H04N 7/186 348/143 |
| 8,872,915 | B1 * | 10/2014 | Scalisi | H04M 11/025 348/140 |
| 8,878,889 | B1 * | 11/2014 | Kaupp | H04W 76/50 348/14.02 |
| 9,113,051 | B1 * | 8/2015 | Scalisi | H04N 7/188 |
| 9,253,455 | B1 * | 2/2016 | Harrison | H04M 11/025 |
| 9,516,485 | B1 * | 12/2016 | Bowers | H04M 19/04 |
| 10,582,035 | B1 * | 3/2020 | Chiang | H04W 4/90 |
| 10,720,038 | B1 * | 7/2020 | Wen | G08B 21/0453 |
| 11,074,801 | B2 * | 7/2021 | Sherman | G08B 7/06 |
| 11,810,447 | B1 * | 11/2023 | Riley | H04M 1/72412 |
| 2002/0096543 | A1 * | 7/2002 | Juselius | A61J 7/0436 222/631 |
| 2003/0121813 | A1 * | 7/2003 | Juselius | A61J 7/0481 206/365 |
| 2003/0122656 | A1 * | 7/2003 | Cavil | G08B 25/12 340/287 |
| 2005/0075907 | A1 * | 4/2005 | Rao | A61B 5/411 705/2 |
| 2005/0176434 | A1 * | 8/2005 | White, Jr. | H04M 1/72424 455/445 |
| 2005/0239477 | A1 * | 10/2005 | Kim | H04W 76/50 455/414.1 |
| 2006/0039241 | A1 * | 2/2006 | Forbath | G04G 11/00 368/110 |
| 2006/0085127 | A1 * | 4/2006 | Lang | G08G 1/20 701/469 |
| 2008/0304628 | A1 * | 12/2008 | Rowe | H04M 11/04 345/173 |
| 2008/0304641 | A1 * | 12/2008 | Rowe | H04M 11/04 345/173 |
| 2009/0289790 | A1 * | 11/2009 | Issokson | G08B 25/008 340/552 |
| 2009/0322521 | A1 * | 12/2009 | Jacobson | H04L 67/30 340/540 |
| 2010/0215153 | A1 * | 8/2010 | Ray | H04M 3/5116 379/45 |
| 2010/0233956 | A1 * | 9/2010 | Hunziker | G08B 27/006 455/40 |
| 2011/0053492 | A1 * | 3/2011 | Hochstein | H05B 47/19 455/7 |
| 2011/0235853 | A1 | 9/2011 | Bowles et al. | |
| 2012/0022890 | A1 * | 1/2012 | Williams | G06Q 50/26 726/4 |
| 2012/0213351 | A1 | 8/2012 | Boyce et al. | |
| 2012/0330683 | A1 * | 12/2012 | Ledwidge | G16H 50/20 705/3 |
| 2013/0127980 | A1 | 5/2013 | Haddick et al. | |
| 2014/0159951 | A1 * | 6/2014 | Gou | G08B 25/10 342/357.55 |
| 2014/0218902 | A1 * | 8/2014 | Maglica | F21V 14/045 362/188 |
| 2015/0029335 | A1 * | 1/2015 | Kasmir | H04N 7/186 348/143 |
| 2015/0049191 | A1 * | 2/2015 | Scalisi | H04N 7/188 348/143 |
| 2015/0116490 | A1 * | 4/2015 | Scalisi | H04M 11/025 348/143 |
| 2015/0145993 | A1 * | 5/2015 | Scalisi | H04M 11/025 348/143 |
| 2015/0279187 | A1 * | 10/2015 | Kranz | G08B 21/0415 340/539.12 |
| 2015/0294431 | A1 * | 10/2015 | Fiorucci | G07B 15/02 705/13 |
| 2015/0319411 | A1 * | 11/2015 | Kasmir | H04N 7/186 340/328 |
| 2015/0341603 | A1 * | 11/2015 | Kasmir | H04N 7/186 340/584 |
| 2016/0294199 | A1 | 10/2016 | Poffinbarger, II | H02J 9/061 |
| 2017/0048495 | A1 * | 2/2017 | Scalisi | H04L 12/2825 |
| 2017/0061560 | A1 * | 3/2017 | Bullard | G06Q 20/14 |
| 2017/0228953 | A1 * | 8/2017 | Lupovici | G07C 9/00896 |
| 2017/0236390 | A1 * | 8/2017 | Herschkowitz | A61B 5/4833 340/539.12 |
| 2017/0280109 | A1 * | 9/2017 | Scalisi | H04N 23/667 |
| 2018/0047261 | A1 * | 2/2018 | Bauldree | G01S 5/0009 |
| 2019/0339804 | A1 * | 11/2019 | Gleeson | G06F 3/0488 |
| 2019/0370507 | A1 * | 12/2019 | Byrd | H04W 68/005 |
| 2019/0385438 | A1 * | 12/2019 | Cholhan | H04W 4/90 |
| 2019/0387879 | A1 * | 12/2019 | Innella | A47B 81/00 |
| 2020/0252779 | A1 * | 8/2020 | McFadden | H04M 1/72424 |
| 2020/0279467 | A1 * | 9/2020 | Sherman | F16M 11/22 |
| 2020/0358908 | A1 * | 11/2020 | Scalisi | G08B 13/19667 |
| 2021/0194718 | A1 * | 6/2021 | Scalisi | H04N 7/186 |
| 2021/0321953 | A1 * | 10/2021 | Panneer Selvam | A61B 5/681 |
| 2021/0388659 | A1 * | 12/2021 | Jaroff | E05F 13/04 |
| 2021/0395983 | A1 * | 12/2021 | Hwang | E03C 1/052 |
| 2021/0400457 | A1 * | 12/2021 | Mgbenka | B60R 25/102 |
| 2022/0046402 | A1 * | 2/2022 | Feng | H04N 21/437 |
| 2022/0130229 | A1 * | 4/2022 | Barnett | H04B 1/3888 |
| 2022/0189285 | A1 * | 6/2022 | Kutscher | H04B 1/3888 |
| 2022/0223027 | A1 * | 7/2022 | Lehr | G16H 20/13 |
| 2022/0368556 | A1 * | 11/2022 | Scalisi | H04N 23/661 |
| 2023/0027652 | A1 * | 1/2023 | Liyanaractchi | G06Q 20/322 |

* cited by examiner

INTERACTIVE KIOSK WITH EMERGENCY CALL MODULE

BACKGROUND OF THE INVENTION

1. Field of the Invention

This application relates generally to an interactive kiosk installed at a geographic location and, more specifically, to a kiosk and dynamic method of providing information services to pedestrians at a geographic location.

2. Description of Related Art

Conventional kiosks can be programmed to display information to onlookers. The information displayed can include advertisements about upcoming events, notifications, and other information that is pertinent to the geographic location where the kiosk is installed. However, the information displayed is typically fixed, once programmed, or periodically changed according to a scheduled program. Onlookers traditionally have not had the ability to access user-specific information, on demand.

Because public kiosks are intended to broadcast a defined set of generic information to the general public, kiosks have traditionally lacked the ability to communicate information to, or receive data from, portable electronic devices. A communication ability, even if provided to a kiosk, is unlikely to be used out of security concerns by owners of the portable electronic devices. For example, establishing a peer connection via an authentication process involving the exchange of information between a portable, personal electronic device (e.g., an iPhone) and a public kiosk could invite malicious attempts to access the personal electronic device.

Further, if a public kiosk requires device-specific information to be received from the personal electronic device, owners of the personal electronic devices may suspect that such information is being collected for purposes other than simply establishing the peer connection. For example, device-specific information such as a phone number, MAC address, etc. could be collected by the kiosk, and possibly combined with data collected by other kiosks or other data repositories. Analyzing such information could allow the movements, preferences, and possibly other information about users of the portable electronic devices to be determined or inferred, raising privacy concerns that may prevent widespread usage of public kiosks with portable electronic devices.

BRIEF SUMMARY OF THE INVENTION

According to one aspect, the subject application involves a kiosk that is publicly accessible. The kiosk includes a base constructed for installation in a public setting, and an interface that is supportable by the base. The interface receives user input corresponding to content requested to be presented by the kiosk. A control system includes a computer processor that, as a result of executing computer-accessible instructions, causes the control system to access information stored by a non-transitory computer memory and generate an output based on the user input received. A display device is operatively connected to the control system to graphically display the content requested, presenting the content at the public setting based on the output of the control system. An emergency call module that is activated in response to selection of an emergency activator to communicate with a remote terminal over a communication network and request assistance from a responder at the public setting.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

The present technology is directed toward a kiosk to be installed at a public location. The kiosk is publicly accessible to allow pedestrians to access content related to the geographic location where the kiosk is installed, optionally in addition to other content. An example of a publicly-accessible kiosk includes a base constructed for installation in the public setting, such as anchored in concrete or another surface forming walkways in the city or metropolitan region where the kiosk is to be installed. An interface is to be supported atop the base, to receive user input corresponding to content requested to be presented by the kiosk. A control system includes a computer processor that, as a result of executing computer-accessible instructions, causes the control system to access information stored by a non-transitory computer memory and generate an output based on the user input received. A display device is operatively connected to the control system to graphically display the content requested, presenting the content at the public setting based on the output of the control system. An emergency call module of the kiosk is to be activated in response to selection of an emergency activator to communicate with a remote terminal over a communication network and request assistance from a responder at the public setting.

Kiosks installed in public settings, such as at outdoor locations throughout a city or metropolitan area for example, may also serve as a call station where emergency help from a responder such as law enforcement or medical services can be summoned. False calls for a response to an emergency at a public kiosk, however, can erode the confidence of first responders that future calls are legitimate. Further, responding to all calls, including inadvertent or intentional false requests for assistance has the potential to divert resources from legitimate emergency calls.

For example, false calls for emergency assistance can be caused by inadvertent selection of an instantaneous input device such as a simple push button. A pedestrian could bump an exposed push button. Such an instantaneous input device provides input as soon as an electrical contact closes an electric circuit. The act of closing the electric circuit is all that is required, even if caused by an electric arc between contacts, inadvertent contact with a button or other anomaly, as there is no minimum dwell time in a selected state required for an instantaneous input device to cause a request for help to be issued. As a result, accidental contact with such an instantaneous input device is often sufficient to instantly request an emergency response at the very moment the instantaneous input device is accidentally contacted, causing an unnecessary emergency response.

Some embodiments of the emergency call module of the present kiosk are activated in response to selection of an emergency activator to communicate with a remote terminal over a communication network and request assistance from a responder at the public setting. To at least partially mitigate false calls for assistance from a responder via the emergency call module, some embodiments of the emergency activator include an activation button, activation switch, or other activation device that requires deliberate selection to cause a request for assistance to be issued.

Deliberate selection requires more than instantaneous or momentary selection of the emergency activator to issue a request for assistance from a responder at the kiosk. For example, pushing a button and immediately releasing the button the moment the button is fully pressed can be considered an instantaneous or momentary selection of an emergency activator. As such, the momentary pressing of the button is insufficient to cause the emergency call module to transmit a request for assistance from a responder. Instead, the button of the present example must be held in the fully-pressed position for an extended period, longer than a momentary pressing of the button, to indicate a deliberate attempt to request a responder to render assistance at the kiosk. In other words, the action of holding the button in the fully-pushed position for the extended period of time is determined to be a deliberate act, and unlikely the result of a momentary pushing of the button that can result from inadvertent contact.

Figure 1:
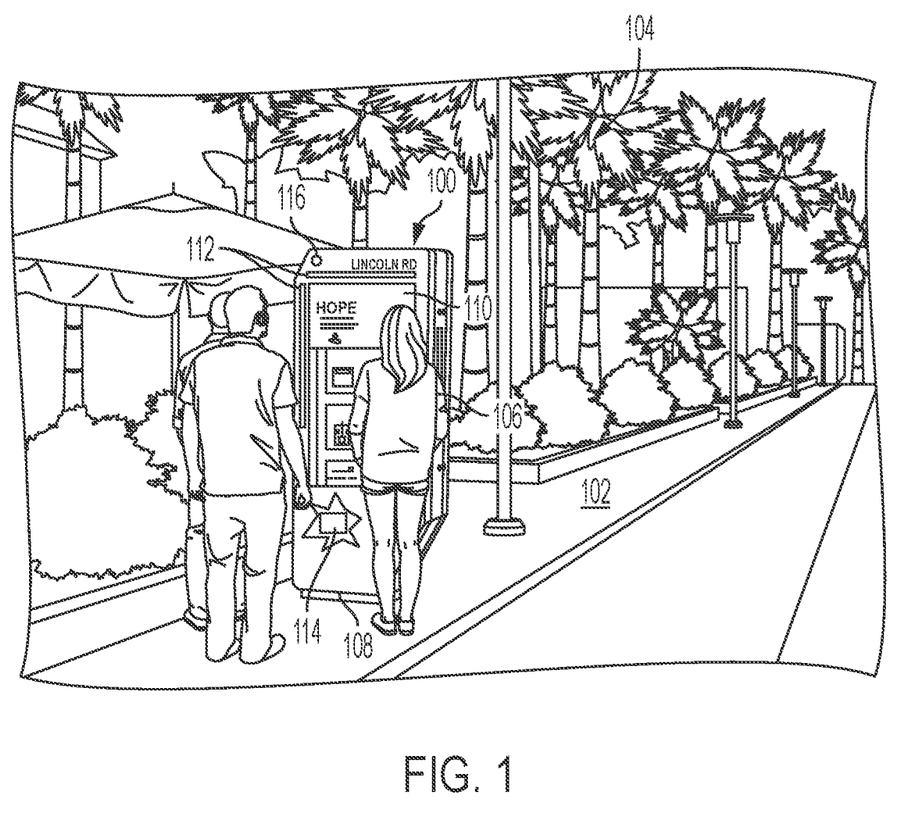
FIG. 1 shows an embodiment of a kiosk fixedly installed in a public, outdoor environment.

With reference to the drawings, FIG. 1 shows a kiosk 100 installed along a sidewalk 102, in a public, outdoor environment 104, where the kiosk 100 can be accessed by pedestrians 106. Although FIG. 1 shows the kiosk 100 installed at an outdoor location, the kiosk can be installed at an indoor location, a quasi-indoor location (e.g., bus terminal, subway station, etc.), or any other publicly-accessible location encountered by pedestrians 106.

As shown, the kiosk 100 includes a base 108 fixedly installed to the underlying ground, which is the sidewalk 102 in FIG. 1. Being fixedly installed, the base 108 can be bolted or otherwise anchored to the ground, requiring the use of a tool offering a mechanical advantage to separate the base 108 from the ground without subjecting the base 108 to damage.

A display device 110 is supported by the base 108 at an elevation vertically above the sidewalk 102. Embodiments of the base 108 and display device 110 can include a bottom edge of the display device 110 supported at least fifteen (15 in.) inches above the sidewalk 102, for example. The display device 110 can optionally be supported by the base so the top edge of the display device 110 is at least thirty (30 in.) inches above the sidewalk 102, and up to forty-eight (48 in.) inches above the sidewalk 102. For example, the display device 110 can include a height that is at least twenty five (25 in.) inches tall, or at least thirty (30 in.) inches tall, or at least thirty five (35 in.) inches tall, or at least forty (40 in.) inches tall, etc. The height of the display device 110 provides sufficient screen area to display the requested content, and limits the footprint of the sidewalk 102 consumed by the kiosk 100.

The display device 110 can be configured as a touch-sensitive display device, forming an interface by which user input can be entered into the kiosk 100. For example, touch-sensitive circuitry 112 including one or more transparent electrodes can form an x-y grid of sensor pixels in a plane that is generally parallel with an external surface of the display device 110. Human contact with a region of the display device 110 influences a sensed electrical value in the vicinity of that region. The influence is detected by vertical and horizontal portions of the touch-sensitive circuitry 112 to pinpoint the location of the region that was contacted. A spatial relationship between content displayed by the display device 110 and the contacted region of the touch-sensitive circuitry 112 can be utilized by a control system 114, described below, that is operatively connected to the touch-sensitive circuitry 112 to provide context to the user input.

Although the embodiment of the interface is described above as a touch-sensitive display device, the present application technology is not so limited. Examples of other embodiments of the interface can optionally include at least one of a track ball, a track pad, and a keyboard.

A camera 116 (e.g., including a CMOS, CCD, etc. imaging sensor) can optionally be included as part of the kiosk 100. The camera can be trained on a region immediately in front of the kiosk 100, or on another region having a backdrop of interest. For example, a kiosk 100 installed within view of a landmark may include a camera 116 trained on that landmark. Pedestrians 106 can stand within the field of view of the camera 116, and have their photographs taken. The display device 110 can optionally display the field of view as a digital viewfinder, allowing the pedestrians 106 to properly position themselves within the photograph, relative to the landmark.

The photographs can be stored locally, in a non-transitory computer-readable medium 1005 (FIG. 4) connected to the control system 114, supported by the base 108. According to other embodiments, the photographs can be stored in a remotely-located, non-transitory computer-readable medium, by transmitting the photographs over a communication network. To limit the impact of transmitting photos on bandwidth available to the kiosk 100, transmission of the photos can occur at times when bandwidth usage is below a threshold, such as during the night, when few pedestrians are expected to interact the kiosk 100.

The control system 114 is operable to dynamically generate various graphical user interfaces such as menus, search interfaces, maps, and other content requested by pedestrians 106. According to one embodiment, the control system 114 can be a computing device 1000 or a computer 1015 forming a portion of the computing device 1000, as shown and described with reference to FIG. 4, for example.

Figure 2:
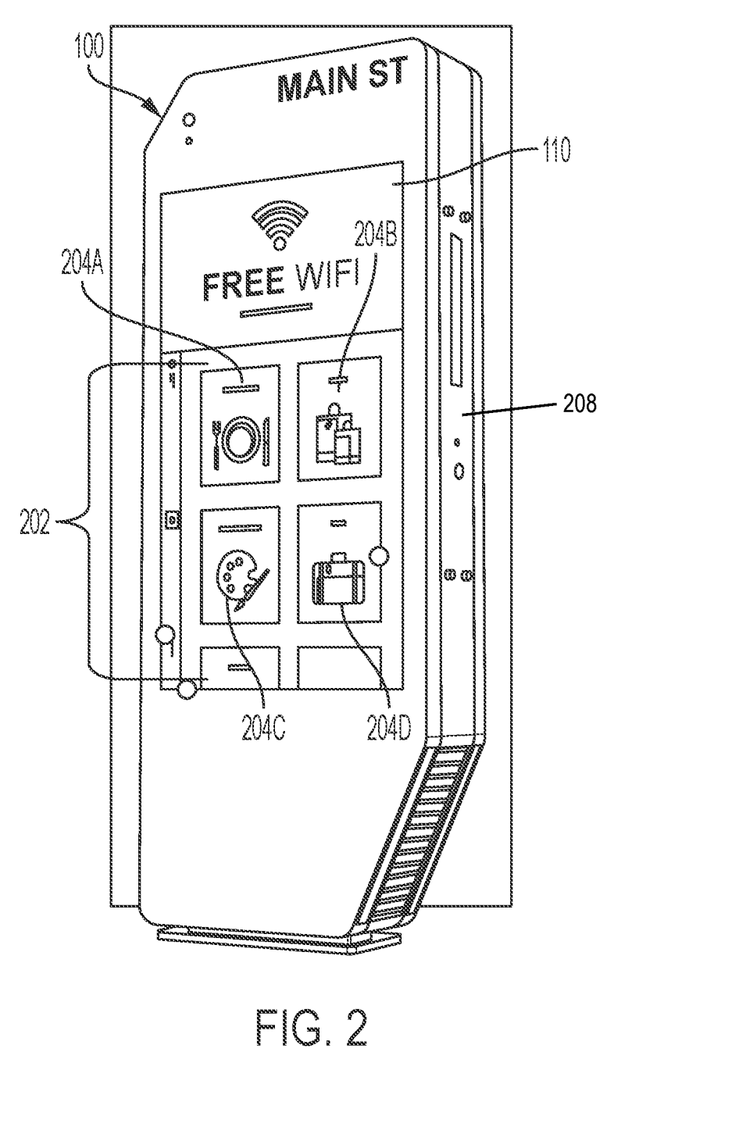
FIG. 2 shows an embodiment of a kiosk with a touch-sensitive display device displaying an interactive menu.

FIG. 2 shows an embodiment of the kiosk 100, with the display device 110 displaying an interactive menu 202. The menu 202 includes a plurality of icons, generally referred to at 204, each representing a different category of content that can be requested by a pedestrian 106 through the touch-sensitive display device 110 as the interface, for example. The menu 202 can optionally include all available icons 204, or can be scrollable, tabulated, or otherwise configured to allow hidden icons 204 that are not concurrently displayed on a single page to be made viewable.

The icons 204 of the embodiment of the kiosk 100 shown in FIG. 2 include a dining icon 204A. In response to receiving user input via the interface indicating a user selection of the dining icon 204A, the display device 110 can present a dining interface. For the present embodiments, and the description that follows, the interface will be described as a touch-sensitive display device 110 that receives user input as a result of the pedestrian 106 contacting the display device 110.

The dining interface can include information about local dining options in the vicinity of the geographic location of the kiosk 100. For example, a list of local dining options can be presented in an order of increasing distance from the kiosk. The order, and/or the local dining options displayed can optionally be user-definable. For example, the local dining options can be sorted based on at least one of: distance from the kiosk 100, user reviews, cost, etc. As another example, the local dining options displayed can be filtered based on at least one of: type of cuisine, cost, minimum review score, maximum distance from the kiosk 100, attire, etc., thereby limiting the number of local dining options displayed.

The local dining options displayed can optionally be obtained from a dining database, locally stored by the non-transitory computer-readable medium 1005 (FIG. 4) that is connected locally to the control system 114. Being locally connected allows the control system 114 to access and communicate with the non-transitory computer-readable medium 1005, even in the absence of a communication network connecting the kiosk 100 to a separate computer terminal. Information in the dining database can optionally be updated occasionally, such as by caching information received from a remotely-stored database over a communication network at times when such a network is available. Updates can also optionally be scheduled for times when network traffic is relatively low, compared to high-traffic times of day. The local dining options displayed can optionally be accompanied by information about the type of cuisine, and/or rating information indicating local dining reviews submitted by pedestrians or others who have dined at the respective local dining options. A refinement tool can optionally be provided to allow the pedestrians to filter the local dining options displayed according to at least one of: a desired cuisine, a minimum review threshold, a distance from the kiosk 100, and other options.

In response to receiving user input selecting one of the displayed dining options, a computer processor of the control system 114 executes computer-accessible instructions and, as a result, causes the control system 114 to access information related to dining options nearby stored by a non-transitory computer memory. The control system 114 generates an output based on the user input received and the output causes the display device 110 to graphically display the content requested (e.g., nearby dining options), presenting the content to the pedestrian 106 at the public setting of the kiosk 100. The local dining options, any other dining options 401 or other content retrieved by the control system 114 based on the user input, can optionally be retrieved or otherwise obtained from a website operated and/or hosted by, or on behalf of a third party.

Although dining options are described herein as an example of the content displayed by the display device 110, the present disclosure is not so limited. Entertainment options, landmark options, retail options, service locations, directions to a destination, any other content of interest in the geographic region where the kiosk 100 is installed, etc. are all examples of the content that can be displayed based on user input to the kiosk 100.

Another example of the output generated by the control system 114 includes a computer-readable code, such as the code described in U.S. patent application Ser. No. 16/747, 929 to Gilbert et al., which is incorporated in its entirety herein by reference.

Figure 3:
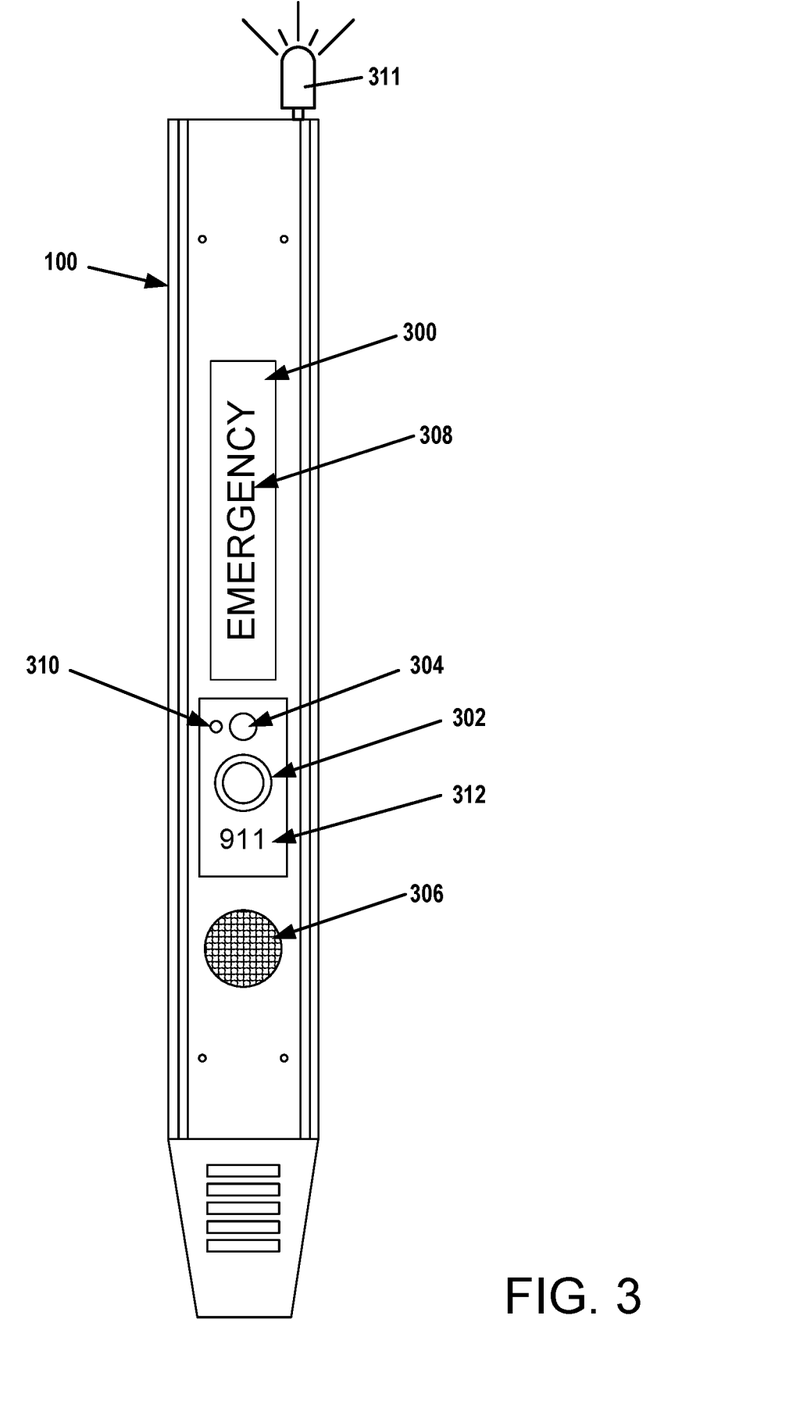
FIG. 3 shows a side view of an illustrative embodiment of a kiosk that includes an emergency call module.

FIG. 3 shows a side view of an illustrative embodiment of a kiosk 100 that includes an emergency call module 300. The emergency call module 300 can optionally be installed in the kiosk 100 as a modular cartridge, such as a so-called "plug and play" component. As shown in FIG. 2, a lateral side panel 208 of the kiosk 100 can enclose a side of an interior chamber housing the control system 114, for example. The lateral side panel 208 lacks one or more features associated with the emergency call module 300, such as an emergency activator 302, described below. Installing the emergency call module 300 as an optional, modular cartridge allows different configurations of the kiosk 100 to be efficiently manufactured based on a common platform, as needed.

Some embodiments of the kiosk 100 including the emergency call module 300 include an emergency activator 302. A label 312 is arranged adjacent to the emergency activator 302, and can have a readily-observable (e.g., bright color, illuminated, etc.) appearance that makes the position of the emergency activator stand out from a surrounding portion of the kiosk 100. Examples of the label 312 include indicia notifying pedestrians 106 that the emergency activator 302 is to be used for emergency purposes only.

Examples of the emergency activator 302 include an activation button, activation switch, touch-sensitive region of the display device 110, foot pedal, or any other device that is manually selectable by the pedestrian 106 to cause the control system 114 to transmit a request for assistance from a responder to be issued. The request can be transmitted over a communication network such as a cellular and/or public-interchange phone network, a local area network ("LAN") such as an 802.1x compliant network established under the Institute of Electrical and Electronics Engineers ("IEEE") or an Ethernet connection, a wide area network ("WAN") such as the Internet, or any combination thereof.

Regardless of the form of the communication network, the request can be transmitted to a remote computer terminal to be presented to an operator such as an emergency services dispatcher or other person. The dispatcher or other operator can have the authority or responsibility to dispatch or otherwise instruct the responder to offer assistance at the location of the kiosk 100, which can be included in the request transmitted by the kiosk over the communication network. For example, the dispatcher can direct a member of law enforcement (e.g., police, sheriff, agency, etc.), a member of a fire department, emergency medical personnel, etc. to the location of the kiosk 100.

The emergency call module 300 can be activated in response to selection of the emergency activator 302 to communicate with the remote computer terminal and request assistance from a responder at the public setting. To at least partially mitigate false calls for assistance from the emergency call module 300, some embodiments of the emergency activator 302 require deliberate selection of the emergency activator 302 to cause a request for assistance to be issued.

Deliberate selection requires more than instantaneous or momentary selection of the emergency activator 302 to issue a request for assistance from the kiosk 100. Using a pushbutton embodiment of the emergency activator 302 as an example, pushing a button and immediately releasing the button the moment the button is fully pressed can be considered an instantaneous or momentary selection of an emergency activator. As such, the momentary pressing of the button is insufficient to cause the emergency call module 300 to transmit a request for responder assistance. Instead, the button of the present example must be held in the fully-pressed position for an extended period, longer than a momentary pressing of the button, to indicate a deliberate attempt to request a responder to render assistance at the kiosk.

The action of holding the button in the fully-depressed position for the extended period of time is determined to be a deliberate act, and unlikely the result of a momentary pushing of the button that can result from inadvertent contact. Implementation of the deliberate push requirement can be achieved by configuring the pushbutton module, for example, or can be implemented as computer-executable instructions executed by the control system 114. For example, the control system 114 can be configured with computer-executable instructions to require a signal conducted as a result of the contacts of the pushbutton being closed to be received by the control system 114 for a defined length of time.

For example, when the pushbutton is subjected to a deliberate push, the control system 114 transmits the request for assistance after expiration of an extended length of time. According to some embodiments, the deliberate push is determined to have occurred after the activation button is maintained in a selected state, or fully-depressed, for at least one third (⅓ sec.) of a second. According to other embodiments, the activation button is required to be maintained in the selected state, or fully-depressed, for at least one half (½ sec.) of a second. According to other embodiments, the activation button is required to be maintained in the selected state, or fully-depressed, for at least one (1 sec.) second.

The example of the emergency activator 302 as a pushbutton is described above merely as an example. For any of the embodiments of the emergency activator 302, prolonged selection can optionally be required to transmit the request for emergency assistance.

The emergency call module 300 can also optionally include a microphone 304 operationally connected to the control system 114. The microphone 304 can be activated in response to selection of the emergency activator 302 to convey audible input over the communication network to be reproduced to the operator. An optional speaker 306 can broadcast audio communications from the operator to the ambient environment of the kiosk 100, allowing two-way communications to occur between a pedestrian 106 at the kiosk 100 and the operator.

The emergency call module 300 can optionally include an emergency camera 308. The emergency camera 308 is operationally connected to the control system 114 to capture content such as still images, video, or a combination thereof, of the portion of the public setting where the kiosk 100 is installed in response to selection of the emergency activator 302. For example, the emergency camera 308 can be trained on a region of the public setting where the kiosk 100 is installed, to capture still and/or video images of the space where a pedestrian 106 may stand while selecting the emergency activator 302. To alert pedestrians and/or a responder to an active request for emergency assistance, a light 310 or other visible indicator is operatively connected to the control system 114, and is activated in response to selection of the emergency activator 302. The light 310 can be arranged adjacent to the emergency activator 302 to notify the pedestrian requesting emergency assistance that the request has been issued in response to selection of the emergency activator 302. According to some embodiments, the light 310 can be located at a different location on the kiosk 100, or a second light 311 can be installed to be more conspicuous than the light 310 visible at the side panel 208 as shown in FIG. 3. For example, the second light 311 can be installed to extend upward, from a top of the kiosk 100 as a beacon. Being installed atop the kiosk 100, the second light 311 is located at a vertical elevation above that of the light 310, and emits light 360° about a vertical axis to be visible to approaching responders, regardless of the direction from which they are approaching. The second light 311 may be included as part of the kiosk 100 instead of, or in addition to the light 310. Operation of the light 310 and/or the second light 311 can be terminated remotely, once the situation giving rise to the request for emergency assistance has been resolved.

According to alternate embodiments at least one of the emergency camera 308, the camera 116 (FIG. 1), and any other camera provided to the kiosk 100 can remain operational without selection of the emergency activator 302. For such embodiments, image(s) and/or video of the region adjacent to the emergency activator 302, and any other region within view of the camera 116 and/or other camera, can be captured in an attempt to document events that unfold at times such as immediately before the selection of the emergency activator 302.

In response to selection of the emergency activator 302, or at another time, the content captured by the emergency camera 308 can be transmitted to a remote computer terminal over the communication network, to be stored in a non-transitory computer-readable medium and retrieved for viewing by the operator or another party. A time stamp can be inserted into the content captured by the camera 308, allowing the content to be archived in a way that allows events of interest (e.g., selections of the emergency activator 302) to be recalled and viewed.

According to some embodiments, the content captured by the emergency camera 308 can be live streamed to a remote storage device. Some embodiments of the kiosk 100 include an internal data storage device such as a video recorder 1011 including a hard disk drive, solid state drive, etc., to locally store the content captured by the emergency camera 308 in the kiosk 100. Locally-stored content can optionally be retained within the kiosk 100 for a defined retention period, or until a time when space on the internal data storage device is required. For example, the computing device 1015 can optionally include a video recorder 1011 (FIG. 4) that stores the content captured by the camera 308, 116, etc., on the hard disk drive, solid-state drive, or any other readable and writable media, for example. The locally stored content can be stored under a first-in, first out model that records over the oldest content stored by the video record 1011 when new space for recordings is needed. The locally stored content can be transmitted over the communication network or otherwise retrieved in response to a request for emergency assistance to preserve a record of the circumstances, if captured in the content, giving rise to the request. Accordingly, cellular bandwidth can be conserved until a time when the locally stored content is needed instead of transmitting all captured content to a remote archive. The locally-stored content can subsequently be transmitted to a remote computer terminal for archival purposes, or written over in the absence of any activations of the emergency activator 302.

Figure 4:
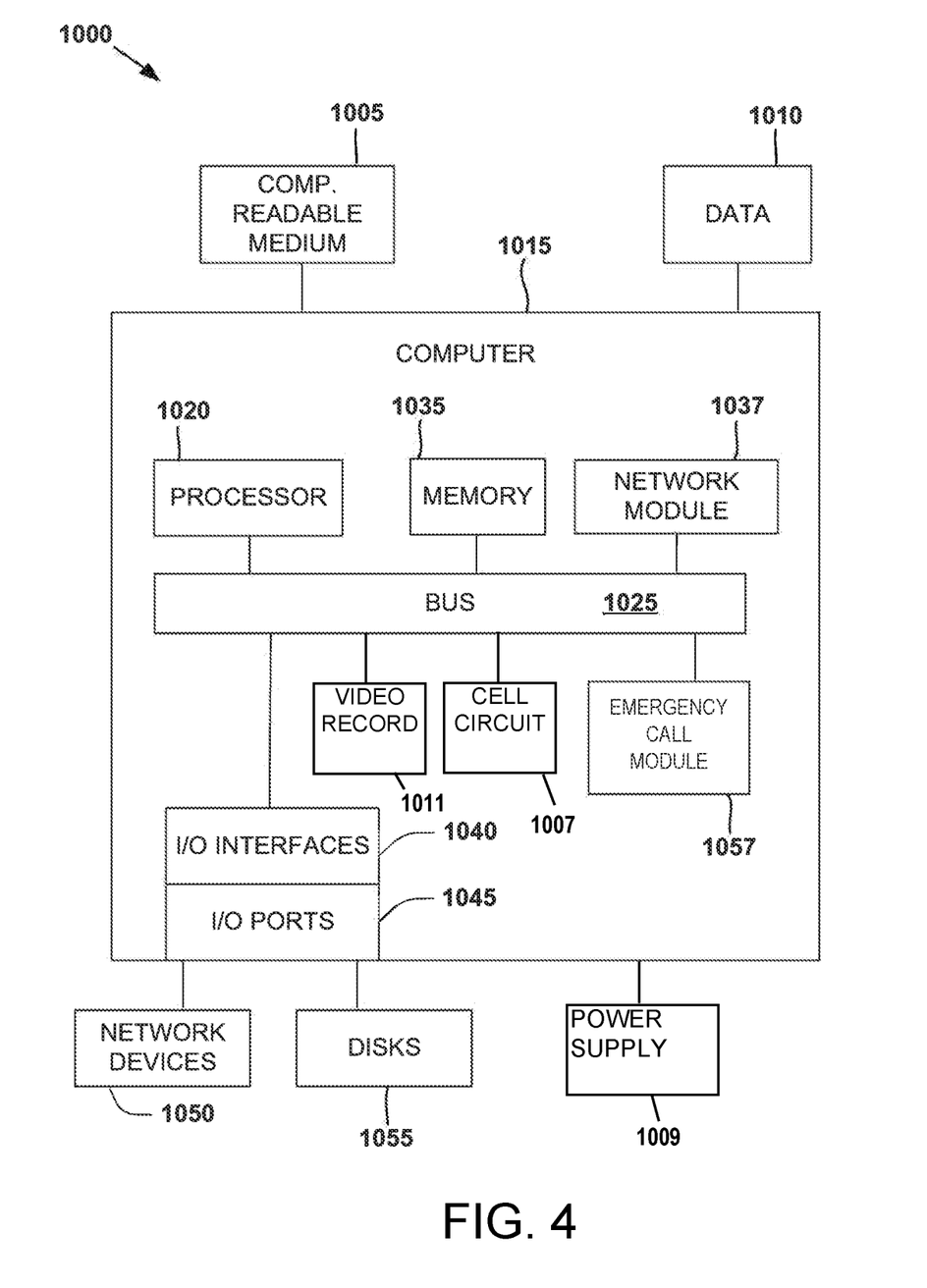
FIG. 4 illustrates an embodiment of a computing device configured as the illustrative embodiments of a kiosk and/or a portable electronic device described herein, and/or to perform various methods disclosed.

Communications conveying the audio communications, content captured by the emergency camera 308, and optionally other data input or otherwise received by the kiosk 100 can be transmitted over the communication network via any available communication channel. Because the kiosk 100 is a fixture, communication lines such as fiber optic cables, telephone lines, wireless channels can be utilized. As a backup transmission channel to be utilized in the absence of a primary communication channel, or as a primary communication channel, the control system 114 can optionally include a cellular communication circuit 1007 (FIG. 4). For example, the cellular communication circuit 1007 can communicate over a wireless voice channel, and/or a data channel via a voice-over-Internet protocol. A backup power supply 1009 (e.g., lithium ion battery, etc.) (FIG. 4) can optionally be provided to the kiosk 100 to maintain a communication ability, and optionally any or all of the functionality of the kiosk 100 described herein.

In use, a pedestrian requiring emergency assistance can input the need for assistance to the kiosk 100 via deliberate selection of the emergency activator 302. In response to deliberate selection of the emergency activator 302, the control system 114 transmits a request for assistance over the communication network to a remote computer terminal. The remote computer terminal routes the request for assistance to an operator, and the kiosk 100 opens audio communication between the pedestrian 106 and the operator via the microphone 304. The emergency camera 308 can be activated or the control system 114 can insert a time stamp in the content captured by the emergency camera 308 indicative of the time when the request for emergency assistance was issued. The control system 114 can also illuminate the light 310, identifying the kiosk as a source of an active request for emergency assistance.

Computing Device Embodiment

FIG. 4 illustrates an example of a computing device 1000 that is configured and/or programmed with one or more of the illustrative systems and methods described herein, and/or equivalents. The illustrative embodiment of the computing device 1000 may include a computer 1015 that includes a computer processor 1020, a memory 1035, and input/output ports 1045 operably connected by a bus 1025. In one example, the computer 1015 may include emergency call module logic 1057 configured to facilitate transmission of a request for emergency assistance and network module logic 1037 to facilitate network communications as described herein, and/or configured to implement and perform the methods described herein. In different examples, the logic 1037, 1057 may be implemented in hardware, a non-transitory computer-readable medium with stored instructions, firmware, and/or combinations thereof. While the logic 1037, 1057 is illustrated as hardware components attached to the bus 1025, it is to be appreciated that in other embodiments, the logic 1037, 1057 could be implemented in the computer processor 1020, stored in memory 1035, or stored in a non-transitory computer-readable medium 1005.

The computer 1015 may be implemented, for example, as an ASIC programmed to create generate and transmit emergency assistant requests as described herein. According to alternate embodiments, the technology for transmitting emergency assistance requests may also be implemented as stored computer executable instructions that are presented to the computer 1015 as data 1010 that are temporarily stored in memory 1035 and then executed by computer processor 1020.

Logic 1037, 1057 may also be embodied as hardware such as a non-transitory computer-readable medium that stores executable instructions, firmware, etc. When executed, the executable instructions perform a method of anonymously conveying content from a public kiosk to a private portable electronic device as described herein.

Generally describing an illustrative configuration of the computer 1015, the computer processor 1020 may be a variety of various processors including dual microprocessor and other multi-processor architectures. A memory 1035 may include volatile memory and/or non-volatile memory. Non-volatile memory may include, for example, ROM, PROM, and so on. Volatile memory may include, for example, RAM, SRAM, DRAM, and so on.

A storage disk 1055 may be operably connected to the computer 1015 via, for example, an input/output (I/O) interface (e.g., card, device) 1040 and an input/output port 1045. The disk 1055 may be, for example, a magnetic disk drive, a solid-state disk drive, a floppy disk drive, a tape drive, a Zip drive, a flash memory card, a memory stick, and so on. Furthermore, the disk 1055 may be a CD-ROM drive, a CD-R drive, a CD-RW drive, a DVD ROM, and so on. The memory 1035 can store a process and/or a data 1010, for example. The disk 1055 and/or the memory 1035 can store an operating system that controls and allocates resources of the computer 1015.

The computer 1015 may interact with input/output (I/O) devices via the I/O interfaces 1040 and the input/output ports 1045. Input/output devices may be, for example, a keyboard, a microphone, a pointing and selection device, cameras, video cards, displays, the disk 1055, the network devices 1050, and so on. The input/output ports 1045 may include, for example, serial ports, parallel ports, and USB ports.

The computer 1015 can operate in a network environment and thus may be connected to the network devices 1050 via the I/O interfaces 1040, and/or the I/O ports 1045. Through the network devices 1050, the computer 1015 may interact with a network. Through the network, the computer 1015 may be logically connected to remote computers. Networks with which the computer 1015 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a computer processor, a computer, a server operating in a cloud computing system, and so on. In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "alternate embodiment," "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
ROM: read only memory.
USB: universal serial bus.
WAN: wide area network.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A kiosk that is publicly accessible, the kiosk comprising:
   a base constructed for installation in a public setting;
   an interface that is supportable by the base, and receives user input corresponding to content requested to be presented by the kiosk;
   a control system comprising a computer processor that, as a result of executing computer-accessible instructions, causes the control system to access information stored by a non-transitory computer memory and generate an output based on the user input received, the control system comprising computer-executable instructions and configured to receive a signal from an emergency activator;
   a display device operatively connected to the control system to graphically display the content requested, presenting the content at the public setting based on the output of the control system, the display device configured to display an interactive menu comprising a plurality of icons, wherein each icon of the plurality of icons represents a different category of content;
   an emergency call module that is activated in response to selection of the emergency activator to communicate with a remote terminal over a communication network and request assistance from a responder at the public setting, the emergency activator comprising an activation button that transmits the signal from the emergency activator to the control system such that:
      when the emergency activator is subjected to a push that is greater than a defined length of time, the computer-executable instructions of the control system determine that the push is deliberate due to the signal conducted being received by the control system for greater than the defined length of time, which results in the control system transmitting an issuance of the request for assistance; and
      when the emergency activator is subjected to a push that is less than the defined length of time, the computer-executable instructions of the control system determine that the push is not deliberate due to the signal conducted being received by the control system for less than the defined length of time, which does not result in the issuance of the request for assistance;
   a light, operatively connected to the control system, that is activated in response to the computer-executable instructions of the control system determining that the push is deliberate, the light positioned adjacent to the emergency activator on a side panel of the kiosk and indicative of the control system transmitting the issuance of the request for assistance, the side panel enclosing a side of an interior chamber housing the control system; and
   a second light located at a vertical elevation above the light and extending upwardly from a top surface of the kiosk, the second light configured to emit light 360° about a vertical axis to be visible to the responder.

2. The kiosk of claim 1, wherein the deliberate push comprises the activation button being maintained in a selected state for at least one third (⅓ sec.) of a second.

3. The kiosk of claim 2, wherein the deliberate push comprises the activation button being maintained in a selected state for at least one half (½ sec.) of a second.

4. The kiosk of claim 2, wherein the deliberate push comprises the activation button being maintained in a selected state for at least one (1 sec.) second.

5. The kiosk of claim 1 further comprising:
   a microphone that is activated in response to selection of the emergency activator to convey audible input over the communication network to be reproduced to an operator; and
   a speaker that outputs audio from the operator, establishing two-way communication between a user at the kiosk and the operator.

6. The kiosk of claim 1 further comprising a camera that captures content comprising at least one of still images and video of the public setting in response to selection of the emergency activator, the camera operationally connected to the control system.

7. The kiosk of claim 6, wherein the camera is trained on a region of the public setting from where a user activates the emergency activator, and transmits the content to an operator over the communication network.

8. The kiosk of claim 7 further comprising a video recorder that stores the content captured by the camera locally, within the kiosk, to be subsequently transmitted over the communication network as a result of the request for assistance.

9. The kiosk of claim 1 further comprising a label visibly identifying the emergency activator, and wherein one icon of the plurality of icons comprises a dining icon that, when pressed by the user, presents a dining interface related to dining options that are stored by the non-transitory computer memory.

10. The kiosk of claim 1 further comprising a visual indicator that is activated in response to selection of the emergency activator to provide a visible indication that assistance from the responder has been requested, and wherein the plurality of icons are related to two or more of entertainment options, landmark options, retail options, service locations, or directions in a geographic region where the kiosk is installed.

11. The kiosk of claim 8 wherein the camera and the video recorder are operational without selection of the emergency activator such that the camera captures the content and the video recorder stores the content at a time immediately before the selection of the emergency activator.

12. The kiosk of claim 11 wherein a time stamp is inserted into the content captured by the camera, the time stamp indicative of the time when the request for emergency assistance was issued.

13. The kiosk of claim 1, wherein the light and the second light are configured to be controlled and terminated remotely.

14. The kiosk of claim 1 further comprising a camera that captures content comprising at least one of still images and video of the public setting prior to selection of the emergency activator.

15. The kiosk of claim 7, wherein the content captured by the camera is transmitted to a remote computer terminal over the communication network such that the content is stored in a non-transitory computer-readable medium.

16. The kiosk of claim 1, wherein the content requested is stored locally by a non-transitory computer-readable medium that is connected locally to the control system such that the content requested is available in the absence of the communication network connecting the kiosk to a separate computer terminal.

17. The kiosk of claim 1, wherein the emergency call module comprises a modular cartridge component that is configured to be inserted into an interior chamber of the base, such that the emergency call module is installed at a lateral side of the base.

18. The kiosk of claim 1, wherein the second light is attached to a shaft that extends upwardly from the top surface of the kiosk such that the second light is spaced a distance apart form the top surface.

19. The kiosk of claim 1, wherein the display device is touch-sensitive such that the interactive menu receives user input as a result of a user contacting the display device and selecting one of the plurality of icons, and wherein the plurality of icons are configured to be scrollable to allow hidden icons to be made viewable.

20. A kiosk that is publicly accessible, the kiosk comprising:
- a base constructed for installation in a public setting;
- an interface that is supportable by the base, and receives user input corresponding to content requested to be presented by the kiosk;
- a control system comprising a computer processor that, as a result of executing computer-accessible instructions, causes the control system to access information stored by a non-transitory computer memory and generate an output based on the user input received, the control system comprising computer-executable instructions and configured to receive a signal from an emergency activator;
- a display device operatively connected to the control system to graphically display the content requested, presenting the content at the public setting based on the output of the control system, the display device configured to display an interactive menu comprising a plurality of icons, wherein each icon of the plurality of icons represents a different category of content; and
- an emergency call module that is activated in response to selection of the emergency activator to communicate with a remote terminal over a communication network and request assistance from a responder at the public setting, the emergency activator comprising a foot pedal that is attached to the base and is manually selectable by a pedestrian, wherein the foot pedal transmits the signal from the emergency activator to the control system such that:
  - when the emergency activator is subjected to a push that is greater than a defined length of time, the computer-executable instructions of the control system determine that the push is deliberate due to the signal conducted being received by the control system for greater than the defined length of time, which results in the control system transmitting an issuance of the request for assistance; and
  - when the emergency activator is subjected to a push that is less than the defined length of time, the computer-executable instructions of the control system determine that the push is not deliberate due to the signal conducted being received by the control system for less than the defined length of time, which does not result in the issuance of the request for assistance.

\* \* \* \* \*